US012629657B2

(12) United States Patent
Frantz et al.

(10) Patent No.: US 12,629,657 B2
(45) Date of Patent: May 19, 2026

(54) LITHIUM ION ADSORBENTS

(71) Applicant: CONDUCTIVE ENERGY INC.,
Calgary (CA)

(72) Inventors: Jackson Frantz, Calgary (CA); **Majid
Rasool, Calgary (CA); Michael Mislan**,
Calgary (CA); Preston McEachern,
Calgary (CA)

(73) Assignee: **EMPOWER INNOVATION &
TECHNOLOGY LLC**, Addison, TX
(US)

( * ) Notice: Subject to any disclaimer, the term of this
patent is extended or adjusted under 35
U.S.C. 154(b) by 549 days.

(21) Appl. No.: 18/162,965

(22) Filed: Feb. 1, 2023

(65) Prior Publication Data

US 2023/0241581 A1     Aug. 3, 2023

Related U.S. Application Data

(60) Provisional application No. 63/305,978, filed on Feb.
2, 2022.

(51) Int. Cl.
B01J 20/26         (2006.01)
B01J 20/04         (2006.01)
(Continued)

(52) U.S. Cl.
CPC ........... B01J 20/261 (2013.01); B01J 20/041
(2013.01); B01J 20/10 (2013.01);
(Continued)

(58) Field of Classification Search
CPC ........ B01J 20/041; B01J 20/10; B01J 20/261;
B01J 20/28016; B01J 20/28028;
(Continued)

(56) References Cited

U.S. PATENT DOCUMENTS

| | | | |
|---|---|---|---|
| 5,316,855 A | 5/1994 | Wang | |
| 6,991,852 B2 | 1/2006 | Carr | |

(Continued)

FOREIGN PATENT DOCUMENTS

| | | |
|---|---|---|
| CA | 2271354 A1 | 11/2000 |
| CA | 2661453 A1 | 2/2008 |

(Continued)

OTHER PUBLICATIONS

English machine translation of CN108114693A (2020).*

(Continued)

*Primary Examiner* — Richard M Rump
(74) *Attorney, Agent, or Firm* — Meister Seelig &
Schuster PLLC

(57)         ABSTRACT

A lithium ion sorbent includes an organosilane-grafted
lithium ion sieve. The organosilane-grafted lithium ion sieve
is a reaction product of a lithium ion sieve and an organosi-
lane. The lithium ion sieve is either a delithiated orthosili-
cate or a delithiated metal oxide. The organosilane reagent
is of the general formula: $R^1$—$(CH_2)_n$—$Si$—$R^4_3$ where $R^1$
is an organic moiety containing a functional group selected
from an acrylate, methacrylate or vinyl group or their
derivatives, $R^4$ is either a hydrolysable alkoxy group or a
methyl group, where at least one of the three $R^4$ groups is a
hydrolysable alkoxy group and n is 1-3. This lithium ion
sorbent is durable and useful for adsorbing lithium from
aqueous resources. The lithium ion sorbent can also be used
in the manufacture of a composite material where the
organosilane-grafted lithium ion sieve is covalently incor-
porated into a porous crosslinked polymeric support scaf-
fold.

10 Claims, 8 Drawing Sheets

(51) Int. Cl.

| | |
|---|---|
| *B01J 20/10* | (2006.01) |
| *B01J 20/28* | (2006.01) |
| *B01J 20/32* | (2006.01) |

(52) U.S. Cl.

CPC ... *B01J 20/28016* (2013.01); *B01J 20/28028* (2013.01); *B01J 20/28038* (2013.01); *B01J 20/3204* (2013.01); *B01J 20/3219* (2013.01); *B01J 20/3278* (2013.01); *B01J 20/3293* (2013.01)

(58) Field of Classification Search

CPC .............. B01J 20/28038; B01J 20/3204; B01J 20/3219; B01J 20/3278; B01J 20/3293

See application file for complete search history.

(56) References Cited

U.S. PATENT DOCUMENTS

| | | | |
|---|---|---|---|
| 7,943,113 | B2 | 5/2011 | Chung |
| 8,628,827 | B2 | 1/2014 | Espinosa |
| 9,988,280 | B2 | 6/2018 | Donaldson |
| 10,439,200 | B2 | 10/2019 | Snydacker |
| 10,626,020 | B2 | 4/2020 | Reed |
| 10,648,090 | B2 | 5/2020 | Snydacker |
| 2014/0087071 | A1 | 3/2014 | Chung |
| 2017/0217796 | A1 | 8/2017 | Snydacker |
| 2017/0298475 | A1 | 10/2017 | Paranthaman |
| 2019/0276327 | A1 | 9/2019 | Brown |
| 2020/0024686 | A1 | 1/2020 | Reed |

FOREIGN PATENT DOCUMENTS

| | | | | |
|---|---|---|---|---|
| CN | 106390912 A | 2/2017 | | |
| CN | 106902781 A | 6/2017 | | |
| CN | 105903361 B | * 4/2018 | ......... | B01D 67/0079 |
| CN | 108114693 A | * 6/2018 | ........ | B01J 20/28038 |
| CN | 108187608 A | 6/2018 | | |
| CN | 108543516 A | 9/2018 | | |
| CN | 108854996 A | 11/2018 | | |
| CN | 109173976 A1 | 1/2019 | | |
| CN | 109999754 A | 7/2019 | | |

| | | | |
|---|---|---|---|
| EP | 1569289 | A2 | 8/2005 |
| EP | 1569289 | A3 | 8/2005 |
| JP | 2011231378 | A | 11/2011 |

OTHER PUBLICATIONS

Wang, Jingtao, et al. "Embedding sulfonated lithium ion-sieves into polyelectrolyte membrane to construct efficient proton conduction pathways." Journal of Membrane Science 501 (2016): 109-122.*

European Search Report for Application No. 22185190 dated Nov. 29, 2022, 36 pages.

Politaev et al: "Crystal structure, phase relations and electrochemical properties of monoclinic Li "2MnSio" 4", Journal of Solid State Chemistry, Orlando, FL, US, vol. 180, No. 3, Mar. 17, 2007, pp. 1045-1050, XP005927193, ISSN: 0022-4596, DOI: 10.1016/J.JSSC. 2007.01.001 *the whole document*, 6 pages.

Ryu Taegong et al: "Mechanochemical Synthesis of Silica-Lithium Manganese Oxide Composite for The Efficient Recovery of Lithium Ions From Seawater", Solid State Ionics, North Holland Pub. Company. Amsterdam; NL, NL, vol. 308, Jun. 14, 2017 (Jun. 14, 2017), 77-83, XP085182194, ISSN: 0167-2738, DOI: 10.1016/J. SSI.2017.05.020 *the whole document*, 7 pages.

Shenouda A Y et al: "Synthesis, Characterization and Electrochemical Performance of$$\hbox {Li}_{2}\hbox {Ni}_{x}\hbox {Fe}_{1-x}\hbox {SiO}_{4}$$Li2NixFe1-xSi04 Cathode Materials for Lithium Ion Batteries", Bulletin of Materials Science, Indian Academy of Sciences, Bangalore, vol. 40, No. 6, Sep. 6, 2017 (Sep. 6, 2017), pp. 1055-1060, XP036339406, ISSN: 0250-4707, DOI: 10.1007/S12034-017-1449-2 [retrieved on Sep. 6, 2017] *the whole document*, 6 pages.

European Search Report for Application No. 23154550.0 dated Jun. 28, 2023, 9 pages.

Rong, Yu et al., "Preparation and characterization of titanium dioxide nanoparticle/polystyrene composites via radical polymerization," Materials Chemistry and Physics 91 (2005) 370-374, 5 pages.

Maji, Pranabi et al., "Structural, electrical and optical properties of silane-modified ZnO reinforced PMMA matrix and its catalytic activities," Journal of Non-Crystalline Solids 456 (2017) 40-48, 9 pages.

\* cited by examiner

LITHIUM ION ADSORBENTS

RELATED APPLICATIONS

This application claims priority to U.S. Provisional Patent Application No. 63/305,978 filed Feb. 2, 2022, entitled "MOLECULAR ION SIEVE UTILIZING AN ORGANOSILANE MATERIAL AND SELECTIVE METAL ADSORPTION FROM BRINES," which is hereby incorporated by reference in its entirety.

FIELD OF THE INVENTION

The present invention generally relates to ion adsorbents and methods for recovering ions from aqueous resources, and more particularly, to the adsorption of metals and specifically lithium ions from brines.

DESCRIPTION OF PRIOR ART

Conventionally, it is well-known that lithium is obtained from two main sources: solid lithium ores and aqueous lithium resources. Aqueous resources include but are not limited to salt lake brines, underground brines, and seawater as well as industrial waste waters. Estimates are that 60% or more of the total lithium reserves (about 26.9 Mt) and most of the unexploited reserves exist in aqueous resources, making them potentially the most important resource for future demands for lithium.

Generally, lithium is produced from an aqueous resource by a method called the lime-soda method (or evaporation process). This typically involves solar evaporation over 12 to 18 months to produce a lithium brine concentrate of 6,000-60,000 ppm. The concentrate is treated with lime to remove divalent ions like magnesium and then further processed with soda ash to form $Li_2CO_3$. This can be further processed to obtain $LiOH \cdot H_2O$ by electrolysis. Roughly 120.5 kt per year of lithium carbonate is obtained by this process globally. This process is highly dependent on climate conditions and is unsuitable for many if not most aqueous resource locations. The required addition of lime and other flocculants to remove precipitable ions can generate a large quantity of waste that is not environmentally friendly and costly to manage. Other recovery methods are required to overcome the drawbacks of the lime-soda method, which is expensive, slow, inefficient, has undesirable environmental impacts, and is unsuitable for many resource locations where evaporation rates are too low.

In recent years, various new methods have emerged to extract lithium, such as electrodialysis, nanofiltration, and ion-exchange-based extraction. Collectively, these methods are known as direct lithium extraction, or DLE methods. Among the various DLE methods, ion exchange, including molecular sieve methods, have proven to be effective for the extraction of lithium ions in various aqueous sources at potentially low cost, low environmental footprint and rapid production.

A potential drawback of ion exchange methods is that many other ions are present in aqueous resources, and these can also exchange and become impurities in the lithium product. For example, cations such as magnesium, sodium, calcium, zinc, strontium, boron, and potassium may be present with anions such as chloride, bromide, sulfates, nitrates, borates, and the like. Many of these are present in significantly higher quantities than lithium. For example, a simple analysis (cations only) of oil field produced water chemistries shows calcium and sodium concentrations to be routinely present at 300 times and 1200 times, respectively, higher than lithium. Lithium salts for use in battery manufacturing, such as lithium chloride (LiCl), lithium carbonate ($Li_2CO_3$), or lithium hydroxide ($LiOH \cdot H_2O$), should have a purity greater or equal to 99.5% by weight. Therefore, it is crucial for product purity that the ion exchange media used in a DLE method be highly selective for the lithium ion and reject all other ions present in the fluid.

Ion selectivity of a DLE ion exchange method is determined as the molar ratio of the desired product to the undesired product. For example, in a DLE process that makes the desired product of a dissociated lithium salt, the selectivity is calculated as the moles of lithium in the product divided by the moles of undesired positive ions. Poor selectivity is due to undesirable characteristics of the DLE ion exchange material and the overall DLE process. In the first case, the exchange material can incorporate other ions in the same exchange process that incorporates lithium. In the second case, the process equipment used and poor process control may result in contamination of the product with residual source fluid retained in the process. Many DLE ion exchange methods utilize a metal oxide molecular sieve to achieve the high level of selectivity required. However, these sieves can be fragile crystal structures that require a binder to hold the molecular sieve in a functional bead, granule, or membrane as a composite material.

Metal oxides, particularly, variants of manganese and titanium-based oxides such as lithium manganese oxides (LMO) and lithium titanium oxides (LTO) are well known for their DLE capabilities. These metal oxides have been used in lithium extraction since the 90's with the use of aluminum oxides dating back to the 50's. In such an extraction, the metal oxide crystals are small, typically less than 250 micrometers in diameter and preferably less than 25 micrometers in diameter, making them difficult to retain in an aqueous industrial process. The metal oxides must therefore be incorporated into a composite material that binds these small crystals together into larger beads, granules or membranes that can be retained in a reactor or frame through which the water can flow. Once retained, the composite material is contacted with the source fluid to adsorb lithium, typically rinsed, and acid washed to recover the adsorbed lithium from the adsorbent in a proton-lithium exchange process. Not only can the source fluid itself and the exchange process be highly corrosive with large swings in pH, but the process also requires turbulent flow to minimize boundary layer conditions that reduce exchange rates. This combination of harsh chemical exposure, potentially high temperatures, and turbulence can vastly impact the lifespan of the ion-exchange material. It is therefore vital that the composite material have high resilience and that the composite withstands heat, turbulence and both acidic and basic conditions.

Consequently, there remains a need for rugged lithium adsorption materials. There have been several attempts to deploy lithium ion sieves (LISs) such as LMO and LTO in composite materials that retain the advantageous lithium uptake characteristics of the LIS while enhancing its handling characteristics. Among these, a common approach has been granulation of the sieve by encapsulation in a high molecular weight binder. These approaches commonly utilize a phase-inversion method whereby dissolved high molecular weight binder is combined in slurry with a LIS and dripped into a poor solvent to rapidly produce a solid-phase composite particle containing polymer and LIS. Thermoplastic polymers have been employed most commonly in this approach such as polyethersulfone. Recently novel composites of this type using chitosan as the binder have been described. Notably chitosan binder preparations rely on pH to induce phase separation during the granulation step. A crosslinking treatment is typically employed to enhance the properties of these composites; however, it is not the basis for solid particle formation.

A common drawback of high molecular weight binder LIS composite preparations is poor adsorption performance due to poor porosity and lack of accessible ion sieve surface area for exchange in the composites. There have been several attempts to improve the properties of LIS composites derived from high molecular weight binders. These have included deploying the materials in novel formats such as thin membranes and spun fibers. These deployments have enabled novel methods such as lithium purification by ion conductance of the composite. Another class of composites uses high molecular weight porogens such as polyethylene glycol or sacrificial materials such as salt particles to improve sorbent porosity. Despite these innovations, development of rugged LIS composites with superior lithium sorption performance remains a challenge.

SUMMARY OF THE INVENTION

An organosilane-grafted lithium ion sieve is disclosed for adsorbing lithium from aqueous resources. A lithium adsorption composite material incorporating a crosslinked polymeric support scaffold covalently bound to an organosilane-grafted ion sieve is also disclosed. Methods for making and using the sieve and composite material are also presented.

In accordance with a broad aspect of the present invention, there is provided a lithium ion sorbent comprising: an organosilane-grafted lithium ion sieve.

In accordance with another broad aspect of the present invention, there is provided an organosilane-grafted lithium ion sieve covalently incorporated into a porous crosslinked polymeric support scaffold.

In accordance with another broad aspect of the present invention, there is provided a method for producing an organosilane-grafted lithium ion sieve, comprising: grafting an organosilane reagent onto a lithium ion sieve to produce an organosilane-grafted lithium ion sieve.

In accordance with another broad aspect of the present invention, there is provided a method for producing an organosilane-grafted lithium ion sieve covalently incorporated into a porous crosslinked polymeric support scaffold, comprising: grafting an organosilane reagent with a lithium ion sieve to produce an organosilane-grafted lithium ion sieve; and free-radical copolymerization of the organosilane-grafted lithium ion sieve in a pre-polymer mixture containing comonomers to covalently incorporate the organosilane-grafted lithium ion sieve within a polymer scaffold support.

DETAILED DESCRIPTION OF EMBODIMENTS

Figure 1:
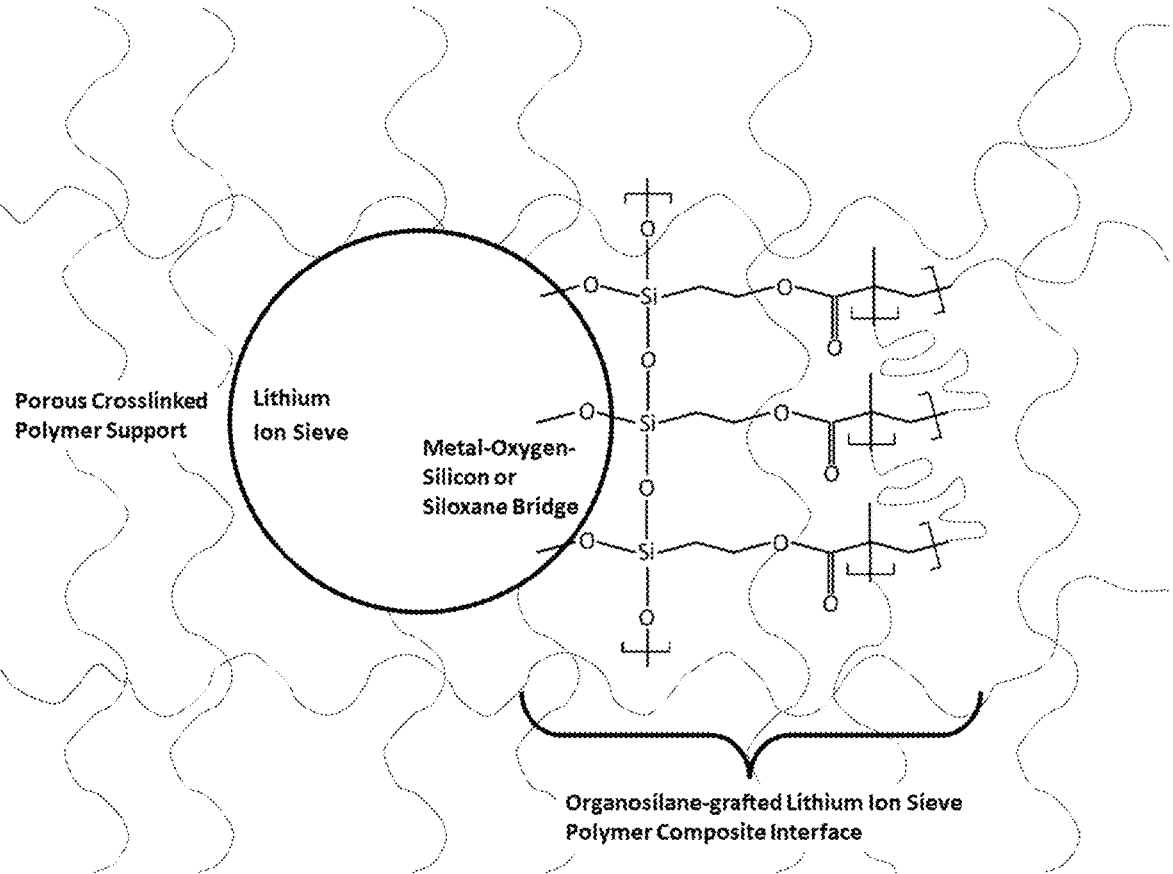
FIG. 1: A schematic depiction of a selective lithium adsorbent incorporating an organosilane-grafted lithium ion sieve covalently incorporated in a porous crosslinked polymer support. The structure depicted corresponds to the use of methacryloxypropyltrimethoxysilane as the grafting reagent with a condensed oligomeric structure at the interface between lithium ion sieve and crosslinked polymer.

An organosilane-grafted lithium ion sieve (o-LIS) has been invented for adsorbing lithium from aqueous resources. This novel grafting technique provides a previously undeveloped method for covalently binding an o-LIS to another material. In addition, a lithium adsorption composite material incorporating a crosslinked polymeric support scaffold covalently bound to an organosilane-grafted ion sieve has been invented.

Lithium ion sieve (LIS) materials can be chemically unstable. Organosilane-grafting may enhance LIS properties. An o-LIS composite material may offer even more durability.

A new approach is disclosed to enable incorporation of LISs in rugged composite materials with practical handling properties while preserving the lithium sorption activity of the native sieve material. Free-radical polymerization allows a high degree of control over material properties through selection of the monomers. A major advantage of monomer selection is the potential to produce hydrogel polymers with tunable hydrophilicity better suited to mass transfer of adsorbates in aqueous resources compared to high molecular weight binders that are often hydrophobic.

The organosilane-grafted lithium ion sieve and the lithium adsorption composite material disclosed herein are firsts among DLE ion exchange solutions. These ion exchange products may resist material dissolution during recurring acid washing steps and thereby have a better life span than conventional DLE materials. These o-LIS ion exchange materials may also have sustained resilience to degradation under turbulent and/or high temperature conditions when compared to underivatized or simply encapsulated lithium ion sieves. In the adsorbent composite, the organosilane interface between the o-LIS and polymer support provides rugged covalently bonded integration of the o-LIS with the polymer enabling enhanced retention of the sieve and protection against hydrolysis under harsh operating conditions.

An organosilane-grafted lithium ion sieve comprises a lithium ion sieve covalently bound to an organosilane moiety via a metal-oxygen-silicon or siloxane (silicon-oxygen-silicon) bridge.

The organosilane-grafted lithium ion sieve, therefore, is as follows:

$$R^1—(CH_2)_n—Si(R^2_2)—(O\text{-}LIS) \qquad \text{(Formula IA)}$$

In the case of a partially condensed oligomer, additional monomeric subunits can be expressed as:

$$R^1—(CH_2)_n—Si(R^2_2)—(O—R^3) \qquad \text{(Formula IB)}$$

where $R^1$ is an organic moiety containing a functional group selected from an acrylate, methacrylate or vinyl group or their derivatives and $R^2$ is one of a methyl group, hydroxyl group, alkoxy group, or a siloxane bridge to a repeating organosilane unit, n is 1-3 and where $R^3$ is one of the LIS, a hydrogen atom or alkyl group.

The lithium ion sieve in the organosilane-grafted lithium ion sieve is selected from (i) or (ii), as follows:
(i) a de-lithiated metal oxide of the general formula:

$$(de\text{-}Li_a)X_bY_cZ_dO_e \qquad \text{(Formula IIA)},$$

where a is between 1 and 4, the sum of b, c and d is between 1 and 5 and e is between 3 and 12. X, Y, and Z are each selected from Fe, Mg, Ca, Ni, Mn, Co, Zn, Cu, Ti, V, Sr or Zr. For example, the de-lithiated metal oxide may be a de-lithiated form of a lithium manganese oxide $Li_aMn_cO_e$ (LMO) or a lithium titanium oxide $Li_aTi_dO_e$ (LTO) such as, for example, $LiMn_2O_4$, $Li_4Mn_5O_{12}$, $Li_2TiO_3$ and $Li_4TiO_5$; or
(ii) a de-lithiated orthosilicate of the general formula:

$$(de\text{-}Li_2)U_{1-f-g}V_fW_gSiO_4 \qquad \text{(Formula IIB)},$$

where f and g are together=0 to 1 and U, V, and W are each selected from Fe, Mg, Ca, Ni, Mn, Co, Zn, Cu, Ti, V, Sr or Zr. For example, the orthosilicate moiety can be a delithiated form of $Li_2FeSiO_4$, $Li_2MgSiO_4$, $Li_2NiSiO_4$, $Li_2CoSiO_4$, $Li_2MnSiO_4$, $Li_2ZnSiO_4$, $Li_2CuSiO_4$, $Li_2TiSiO_4$, $Li_2VSiO_4$, $Li_2SrSiO_4$, $Li_2CaSiO_4$, $Li_2ZrSiO_4$, $Li_2Ti_fMn_gSiO_4$, $Li_2Mg_{1-f-g}Ti_fCa_gSiO_4$ and combination thereof.

Reference may be made to published Canadian patent application 3,167,584, filed Jul. 14, 2022 for a more complete explanation of orthosilicates useful as lithium ion adsorbents. Because the orthosilicate is treated to remove lithium ions, an organosilane-grafted lithium ion sieve produced from an orthosilicate has a structure chemically configured to adsorb lithium ions.

Hereinbelow, the state of being de-lithiated is sometimes indicated with the symbol "α" or "de-Li".

While a metal oxide can be employed, the reaction between the organosilane reagent and an orthosilicate may be preferable via high reactivity toward the formation of siloxane bridges in addition to metal-oxygen-silicon bridges. Therefore, in one embodiment the lithium ion sieve can be a delithiated orthosilicate according to Formula IIB.

The organosilane moiety is from an organosilane reagent described by the general formula:

$$R^1—(CH_2)_n—Si—R^4_3 \qquad \text{(Formula III)},$$

where $R^1$ is an organic moiety containing a functional group selected from an acrylate, methacrylate or vinyl group or their derivatives, $R^4$ is either a hydrolysable alkoxy group or a methyl group, where at least one of the three $R^4$ groups is a hydrolysable alkoxy group, and n is 1-3.

In one embodiment, for example, $R^1$ is an organic moiety containing an acrylate or acrylate derivative functional group. In such an embodiment, the organosilane can, for example, be selected from: 3-acrylamidopropyltrimethoxysilane, n-(3-acryloxy-2-hydroxypropyl)-3-aminopropyltriethoxysilane, acryloxymethyltrimethoxysilane, acryloxymethyl)phenethyltrimethoxysilane, (3-acryloxypropyl)trimethoxysilane, (3-acryloxypropyl)methyldiethoxysilane, (3-acryloxypropyl)methyldimethoxysilane or (3-acryloxypropyl)dimethylmethoxysilane.

In another embodiment, for example, $R^1$ is an organic moiety containing a methacrylate or methacrylate derivative functional group. In such an embodiment, the organosilane can, for example, be selected from: (3-methacrylamidopropyl)triethoxysilane, o-(methacryloxyethyl)-n-(triethoxysilylpropyl)carbamate, n-(3-methacryloxy-2-hydroxypropyl)-3-aminopropyltriethoxysilane, methacryloxymethyltriethoxysilane, methacryloxymethyltrimethoxysilane, methacryloxypropyltriethoxysilane, methacryloxypropyltriisopropoxysilane, methacryloxypropyltrimethoxysilane, methacryloxypropyltris(methoxyethoxy)silane, (methacryloxymethyl)methyldiethoxysilane, (methacryloxymethyl)methyldimethoxysilane, methacryloxypropylmethyldiethoxysilane, methacryloxypropylmethyldimethoxysilane, (methacryloxymethyl)dimethylethoxysilane, methacryloxypropyldimethylethoxysilane or methacryloxypropyldimethylmethoxysilane.

In another embodiment, for example, $R^1$ is an organic moiety containing a vinyl group. In such an embodiment, the organosilane can, for example, be selected from: 11-allyloxyundecyltrimethoxysilane, m-allylphenylpropyltriethoxysilane, allyltriethoxysilane, allyltrimethoxysilane, [(5-bicyclo[2.2.1]hept-2-enyl)ethyl]trimethoxysilane, (5-bicyclo[2.2.1]hept-2-enyl)methyldichlorosilane, 5-bicyclo[2.2.1]hept-2-enyl)triethoxysilanenorbornenyltriethoxysilane, 3-butenyltriethoxysilane, 2-(chloromethyl)allyltrimethoxysilane, [2-(3-cyclohexenyl)ethyl]triethoxysilane, [2-(3-cyclohexenyl)ethyl]trimethoxysilane, 3-cyclohexenyltrimethoxysilane, (3-cyclopentadienylpropyl)triethoxysilane, 2-(divinylmethylsilyl)ethyltriethoxysilane, docosenyltriethoxysilane, hexadecafluorododec-11-en-1-yltrimethoxysilane, 5-hexenyltriethoxysilane, 5-hexenyltrimethoxysilane, 7-octenyltrimethoxysilane, o-(propargyl)-n-(triethoxysilylpropyl) carbamate, styrylethyltrimethoxysilane, 3-(n-styrylmethyl-2-aminoethylamino)propyltrimethoxysilane, 10-undecenyltrimethoxysilane, o-(vinyloxybutyl)-n-triethoxysilylpropyl carbamate, vinyltriacetoxysilane, vinyltri-t-butoxysilane, vinyltriethoxysilane, vinyltriisopropenoxysilane, vinyltriisopropoxysilane, vinyltrimethoxysilane, vinyltris(2-methoxyethoxy)silane, vinyltris(1-methoxy-2-propoxy)silane, vinyltris(methylethylketoximino)silane, n-allyl-aza-2, 2-dimethoxysilacyclopentane, allylmethyldimethoxysilane, (5-bicyclo[2.2.1]hept-2-enyl)methyldiethoxysilane, vinylmethyldiethoxysilane, vinylmethyldimethoxysilane, (5-bicyclo[2.2.1]hept-2-enyl)dimethylethoxysilane, trivinylmethoxysilane or vinyldimethylethoxysilane.

Further, the organosilane may include some functional or non-functional dipodal organosilane reagent according to the general formula:

$$R^5—((CH_2)_n)_2—(Si—R^6{}_3)_2 \qquad \text{(Formula IV)},$$

where $R^5$ is an organic moiety containing a vinyl, aliphatic or aromatic group, $R^6$ is a hydrolysable alkoxy group or a methyl group, where at least two of the three $R^6$ substituent groups on each silicon atom are hydrolysable alkoxy groups, and n is 0-3 and may have one or two values depending on the symmetry of the two methylene chains. In such an embodiment, the organosilane can, for example, be selected from: 1,2-bis(methyldiethoxysilyl)ethylene, bis(triethoxysilylethyl)vinylmethylsilane, 1,2-bis(triethoxysilyl)ethylene, 1,3-[bis(3-triethoxysilylpropyl)polyethylenoxy]-2-methylenepropane, 1,1-bis(trimethoxysilylmethyl)ethylene, bis(3-trimethoxysilylpropyl) fumarate, bis[(3-methyldimethoxysilyl)propyl]polypropylene oxide, 1,2-bis(triethoxysilyl)ethane, bis(triethoxysilyl)methane, 1,8-bis(triethoxysilyl)octane, 1,2-bis(trimethoxysilyl)decane, 1,2-bis(trimethoxysilyl)ethane, bis(trimethoxysilylethyl)benzene, 1,6-bis(trimethoxysilyl)hexane or 1-(triethoxysilyl)-2-(diethoxymethylsilyl)ethane.

Combinations of organosilanes can be present in the organosilane-grafted lithium ion sieve.

The general process for manufacturing an organosilane-grafted lithium ion sieve involves treating the lithium ion sieve with the organosilane reagent to create an organosilane-grafted ion sieve. This treating reaction may be carried out under conditions of alkaline or acidic catalysis in solution or without catalysis in a vapor phase. The lithium ion sieve can be lithiated or delithiated, but if lithiated, a delithiation step is carried out to obtain the final product.

According to one exemplary embodiment of the present invention, a method to produce an organosilane-grafted lithium ion sieve comprises the following:

Reaction of a lithium ion sieve with an organosilane reagent, for example, by acidic or alkaline catalysis, to obtain a reaction product.

In some embodiments, the organosilane reagent is activated prior to reaction with the lithium ion sieve. If an activated form of an organosilane reagent is not available, an organosilane reagent can be activated by acidic catalysis.

An activated organosilane reagent is one that has undergone hydrolysis of its hydrolysable groups to produce reactive hydroxyl groups. The reactive hydroxyl groups may further react to form organosilane condensates containing a siloxane bond or bonds between two or more organosilane reagent molecules to form an oligomeric species. The condensation is partial, such that linear oligomers are formed which contain one or more reactive hydroxyl groups per silicon atom. This is generally conducted by acidic catalysis. Examples of commercially available activated organosilane oligomers are (3-acryloxypropyl)trimethoxysilane, oligomeric hydrolysate; methacryloxypropyltrimethoxysilane, oligomeric hydrolysate; vinyltriethoxysilane, oligomeric hydrolysate and vinyltrimethoxysilane, oligomeric hydrolysate.

As noted, in one method, the reaction of a lithium ion sieve with an organosilane reagent may be by acidic or alkaline catalysis. In such an embodiment, this includes combining the lithium ion sieve and the organosilane reagent, for example an activated reagent, in either an acidic or alkaline solution followed by sufficient contact time between the lithium ion sieve and the organosilane reagent such that partial condensation occurs between the reagent and surface hydroxyl groups in the lithium ion sieve. This partial condensation comprises two possible mechanisms. One mechanism is an instance of the complete grafting reaction wherein a molecule of water is eliminated to form a covalent bonding association between the surface of the lithium ion sieve and the organosilane reagent composed of a metal-oxygen-silicon bridge structure. In the case of an orthosilicate lithium ion sieve the covalent association may have a siloxane (silicon-oxygen-silicon) bridge structure. The second mechanism is the physical association of the organosilane reagent with the surface of the lithium ion sieve without the complete formation of covalent bonds that characterizes the grafting reaction. This may occur via interactions such as hydrogen bonding between an activated organosilane reagent and the surface of the lithium ion sieve or incomplete grafting of a partially condensed organosilane oligomer on the surface of the lithium ion sieve such that some covalent bonds are formed between the sieve and oligomer while still more reactive hydroxyl groups are present in the latter.

While the above describes a reaction method involving alkaline or acidic catalysis, it is to be understood that in some embodiments, the organosilane reagent may react directly with the lithium ion sieve without activation and without catalysis. In these embodiments the grafting reaction occurs between hydrolysable alkoxy groups in the organosilane reagent and surface hydroxyl groups of the sieve without intermediate hydrolysis or condensation steps. This reaction may occur under anhydrous and/or uncatalyzed conditions with the organosilane reagent present in the liquid or vapor phase. A direct grafting reaction of this type proceeds with the elimination of an alcohol molecule concurrent with formation of the covalent bond to the lithium ion sieve.

In some methods, after the initial reaction, a curing step is required to complete the grafting reaction between the organosilane reagent and the lithium ion sieve. Curing may proceed by collecting the reaction product as described above, which is generally a solid particulate, and heating it under ambient pressure. By doing so any residual solvent on the surface of the particles is eliminated thereby promoting the complete condensation of any physically associated organosilane reagent molecules or oligomers with the surface of the lithium ion sieve to form the final organosilane-grafted lithium ion sieve.

In one manufacturing process, for example, an organosilane reagent according to Formula III is activated for use. If activation is required, the reagent is treated in an acidic solution to promote hydrolysis of hydrolysable alkoxy groups and partial condensation of the organosilane via siloxane links to produce highly reactive oligomers. For example, the organosilane reagent can be added to an acidic solution for example a mixture of ethanol, water, and acetic acid. The mixture can be agitated using an impeller for between 15 minutes and 12 hours.

The activated organosilane can then be reacted with a LIS, for example a delithiated metal oxide and/or orthosilicate, by acidic or alkaline catalysis to form a reaction product.

If acidic condensation is employed, the activated organosilane and the LIS are combined in an acidic solution. If the organosilane is already in an acidic solution for activation, then the LIS can be added to the solution containing the activated organosilane. The mixture is agitated to disperse the sieve, for example, for between 1 and 6 hours using an impeller and sonication.

Optionally, an alkaline solution can be produced from a base such as dilute sodium hydroxide, an organic solvent such as ethanol, and water. The organosilane and LIS can be mixed in the alkaline solution in order to promote condensation under alkaline conditions.

The reaction product is then separated from the solution and cured. The curing process acts to complete condensation of the silane reagent and to promote formation of covalent metal-oxygen-silicon or siloxane bridges with surface oxides of the lithium ion sieve. The reaction product can be spread or distributed to facilitate the curing process and to directly generate a film or granular product. This process of curing results in the formation of the organosilane-grafted lithium ion sieve. In one embodiment, for example, the reaction product is collected by filtration and cured in an oven heated to 50-80° C. for 2 to 24 hours.

To improve its form, such as to select for size and increase surface area, the resulting organosilane-grafted lithium ion sieve, after curing, may be milled to create a consistent particulate in a powdered or granulated form. For example, the organosilane-grafted lithium ion sieve is placed inside the chamber of a ball mill containing spherical steel grinding media and milled for 1 to 8 hours to achieve a particle size greater than 50 nm and less than 500 μm.

The general formulae for one representative example of the organosilane activation, condensation and grafting reactions to an orthosilicate and metal oxide lithium ion sieve can be expressed according to the following scheme:

Activation: $R^1$—$(CH_2)_n$—$Si$—$R^4{}_3$+$3H_2O$
$R$—$(CH_2)_n$—$Si$—$OH_3$+$3HR^4$ (Reaction 1)

Condensation: $3R^1$—$(CH_2)_n$—$Si$—$OH_3$
$R^1$—$(CH_2)_n$—$Si(O$—$Si(OH)_2$—$(CH_2)_n$—$R^1)_2$—
$OH$+$2H_2O$ (Reaction II)

Orthosilicate LIS grafting: $\alpha$-$Li_2U_{1-f-g}V_fW_gSiO_4$+
$R^1$—$(CH_2)_n$—$Si(O$—$Si(OH)_2$—$(CH_2)_n$—$R^1)_2$—
$OHR^1$—$(CH_2)_n$—$Si(O$—$Si(OH)_2$—$(CH_2)_n$
—$R^1)_2$-$\alpha$-$LiU_{1-f-g}V_fW_gSiO_4$+$H_2O$ (Reaction IIIA)

Metal oxide LIS grafting: $\alpha$-$Li_aX_bY_cZ_dO_e$+$R^1$—
$(CH_2)_n$—$Si(O$—$Si(OH)_2$—$(CH_2)_n$—$R^1)_2$—
$OHR^1$—$(CH_2)_n$—$Si(O$—$Si(OH)_2$—$(CH_2)_n$
—$R^1)_2$-$\alpha$-$Li_{a-1}X_bY_cZ_dO_e$+$H_2O$ (Reaction IIIB)

The organosilane-grafted lithium ion sieve can be employed on its own for lithium recovery. However, in one embodiment, the organosilane-grafted lithium ion sieve can be incorporated into a crosslinked polymer network to produce a lithium adsorption composite material (FIG. 1), which is useful as an ion exchange composite. In the lithium adsorption composite material, the organosilane-grafted lithium ion sieve and the polymeric support structure are covalently bonded, such that the lithium ion sieve is directly supported within the polymer network.

Therefore, a method for producing a lithium adsorption composite material may comprise:

Combination of a grafted lithium ion sieve with a pre-polymer mixture;

Covalent incorporation of the grafted lithium ion sieve within a porous crosslinked polymeric support by free-radical copolymerization; and Comminution of the resultant composite material into sorbent granules.

By 'combination of the grafted lithium ion sieve with a pre-polymer mixture' it generally may mean the addition of the solid particulate organosilane-grafted lithium ion sieve product, obtained as described hereinabove, to a liquid mixture containing a combination of monomers and solvent suitable for the formation of a porous crosslinked polymer. Additionally present in the pre-polymer mixture is a chemical initiator or initiators to provide a source of free radicals for initiation of a polymerization reaction. The organosilane-grafted lithium ion sieve product is dispersed in the pre-polymer mixture to obtain a slurry.

By 'covalent incorporation of the grafted lithium ion sieve within a porous crosslinked polymeric support by free-radical copolymerization' it generally may mean subjecting the slurry mixture described in the previous step to suitable conditions for the formation of a sufficient quantity of free radicals in solution to initiate a polymerization reaction. This can be achieved, depending on the chemical initiator used, by using light of sufficient wavelength and intensity, heat to raise the temperature of the mixture to a sufficient value, by the addition of a chemical catalyst to accelerate the rate of formation of free radicals, or a combination of these methods. Depending on the mode of initiation a synergist or multiple distinct chemical initiator species may be required to produce free radicals by photoexcitation or redox mechanisms respectively. During the free-radical copolymerization reaction a porous crosslinked polymer material is formed from the pre-polymer monomer reactants. As this reaction takes place copolymerization occurs between suitable functional groups originating from the organosilane reagent, and now present on the surface of the organosilane-grafted lithium ion sieve, and the growing polymer chains such that the organosilane-grafted lithium ion sieve is directly incorporated in the covalently bonded carbon backbone chain of the polymer structure. During this reaction step the mixture may be transferred to an alternative vessel or vessels which act as molds to modify the dimensions of the product. Once the reaction is complete the organosilane-grafted lithium ion sieve polymer composite product is obtained as a solid which conforms to the dimensions of the reaction vessel or vessels.

By 'comminution of the resultant composite material into sorbent granules' it generally may mean the further processing of the product obtained in the previous step into smaller pieces by the action of mechanical sizing methods. This involves introducing the material into machinery wherein an element such as a blade or hammer imparts sufficient force on the material to cause a fracture. This mechanism is repeated, often many times, resulting in size reduction and the formation of discrete granules. A sizing element may be incorporated into the machinery such as a screen, or size selection may occur sequentially following size reduction.

The lithium adsorption composite depicted in FIG. 1 can be prepared by free-radical copolymerization of the organosilane-grafted lithium ion sieve with an appropriate principal monofunctional monomer and difunctional cross-linking monomer in the presence of a radical initiator or initiators.

The principal monomer or monomers are selected from species containing one of a vinyl, acrylate, acrylate derivative, methacrylate or methacrylate derivative functional moiety. In one embodiment the principal monomer may, for example, be selected from: vinyl chloride, styrene, methyl acrylate, butyl acrylate, 2-hydroxyethyl acrylate, acrylamide, methyl methacrylate, butyl methacrylate, 2-hydroxyethyl methacrylate and methacrylamide.

The crosslinking monomer or monomers are selected from species containing two vinyl, acrylate, acrylate derivative, methacrylate or methacrylate derivative functional moieties or combinations thereof. In one embodiment the crosslinking monomer may, for example, be selected from:

divinyl benzene, ethylene glycol diacrylate, ethylene glycol dimethacrylate, N,N'-methylenebisacrylamide, vinyl methacrylate and 3-(acryloyloxy)-2-hydroxypropyl methacrylate.

Also present in the pre-polymer mixture is a radical initiator. The radical initiator is a chemical species that can produce free radicals typically by decomposition, by reaction with an additional distinct synergist species following photoexcitation in the case of some photoinitiators, or in a redox reaction between two or more distinct species. In the former case decomposition can occur by a variety of mechanisms such as interaction with light or at elevated temperature. The radical initiator or initiators are selected from species capable of forming free radicals by thermal degradation, photocatalytic degradation, photoexcitation in the presence of a synergist or a redox reaction. In one embodiment the initiator may, for example, be selected from: ammonium persulfate, azobisisobutyronitrile, 2-hydroxy-2-methyl propiophenone, benzophenone with 2-ethyl-(4-N,N-dimethylamino)benzoate as a synergist, or the redox pair dibenzoyl peroxide and N,N-dimethylaniline.

The free-radical copolymerization reaction occurs in a pre-polymer mixture containing the organosilane-grafted lithium ion sieve in a slurry with a solution of monomers, radical initiator and solvent. During the free-radical copolymerization reaction a porous crosslinked polymer material is formed from the pre-polymer monomer reactants. As this reaction takes place, copolymerization occurs between suitable functional groups originating from the organosilane reagent, and now present on the surface of the organosilane-grafted lithium ion sieve, and the growing polymer chain such that the organosilane-grafted lithium ion sieve is directly incorporated in the covalently bonded carbon backbone chain of the polymer structure.

During this reaction, the solvent is inert to the polymerization reaction and present in the reaction medium to act as a porogen. By porogen it generally may mean a substance that impacts the pore volume and pore size distribution in the resulting porous crosslinked polymer support. The mechanism of an inert solvent porogen is to occupy a portion of the reaction volume and to solubilize growing polymer chains. The tendency for the polymer to remain soluble in the inert solvent porogen will affect the porous properties of the final material. Relatively poor solubility of the growing polymer results in phase separation from the solvent at lower molecular weight and gives larger pores in the final material than at higher solubility.

Further to this, a chemical catalyst may optionally be added to the pre-polymer mixture which accelerates the formation of free radicals by decomposition of the initiator. Addition of the catalyst to the pre-polymer mixture, or a solution containing initiator to the prepolymer mixture already containing catalyst, can be viewed as the moment of initiation of the reaction in the case that the presence of the catalyst and initiator together is sufficient for the copolymerization reaction to occur spontaneously at ambient conditions.

For example, the reaction takes place in a slurried mixture incorporating a proportion of solvent porogen not less than 25% by volume and not greater than 90% by volume of the total liquid volume of solvent and monomers present. Additionally the proportions of reactants can be selected such that the organosilane-grafted lithium ion sieve comprises not less than 40% by weight and not greater than 90% by weight of the total weight of reactants. These proportions are optimized to result in a rugged porous material well suited to facilitate mass transfer to the active adsorption sites of the lithium ion sieve.

In one embodiment, the organosilane-grafted lithium ion sieve is manufactured as stated as an option above to contain pendant methacryloxy $R^1$ groups. The organosilane-grafted lithium ion sieve is combined at ambient temperature and pressure with a principal monomer containing a methacrylate functional moiety, a crosslinking monomer containing two methacrylate functional moieties, a porogenic solvent mixture containing water and ethanol, a dissolved persulfate salt radical initiator and N,N,N',N'-tetramethyl ethylenediamine catalyst in a suitable vessel to prepare the lithium adsorption composite. The mixture may be poured into appropriate molds before crosslinking is complete to produce suitable dimensions for direct use or further sizing by comminution.

This process results in a lithium adsorption composite material wherein the organosilane-grafted lithium ion sieve is covalently embedded in the polymer scaffold via participation in the free-radical copolymerization reaction. To improve its form, such as to select for size and increase surface area of the resulting lithium adsorption composite material, the composite may be formed to have a maximized surface area. For example, the composite may be formed, as by molding or milling to create a particulate granulated form. To facilitate handling the particulate may, for example, have a diameter of greater than 250 μm and less than 2 cm. Small granules may be desirable in some applications with diameters between, for example, 0.5 to 3 mm, while in other applications larger granules of diameters between, for example, 5 to 15 mm may be desirable, albeit with slower exchange kinetics. Alternately, the composite can be formed in sheets and used in a membrane-style deployment. The membranes can have a thickness of, for example, 200 μm to 10 mm and an area greater than 100 cm$^2$ and less than 10 m$^2$ for direct use as a lithium sorbent. In one embodiment, the composite can be supported on an underlying support surface such as a framework or cloth. For example, the support surface can be grafted to an organosilane and be incorporated for structural stability and support in the same free-radical copolymerization process used to form the organosilane-grafted lithium ion sieve polymer composite.

The adsorbent composite can be employed directly in its as-synthesized form. Of course, as noted above, the absorbent is best employed in a form with a significant surface area relative to weight such as milled granules, as a coating, formed into beads, fibers, sheets or membranes, distributed and supported on an inert support, etc.

De-lithiated forms of the organosilane-grafted lithium ion sieve or the lithium adsorption composite can be employed to absorb and thereby recover lithium from an aqueous resource. The lithium adsorption composite is most rugged and therefore offers a more durable and cost effective option for lithium recovery over the organosilane-grafted lithium ion sieve or an adsorbent composite produced with an unmodified LIS.

In one embodiment of the present invention, the lithium adsorption composite material is contacted with a lithium-containing aqueous feed brine, for example, in a reactor. The reactor can be, for example, a tank with an agitator or a column subjected to turbulent flow, as is common in water treatment processes. The reactor can contain the liquid to be treated along with the lithium adsorption composite material. The ion exchange composite material may be positioned in the flow path, maintained in suspension by an agitator/mixer or by turbulent flow, providing superior kinetics and minimized barrier to mass transfer of lithium between the ion exchange composite and the aqueous resource. The pH of the brine in the reactor can be maintained at a desired level through additions of a base, such as sodium hydroxide, ammonium hydroxide, potassium hydroxide, sodium carbonate, magnesium hydroxide, and calcium hydroxide. For example, the pH of the feed in the reactor may be maintained at greater than 6.0 and less than 11.0 throughout the phase where the composite material is adsorbing lithium from the aqueous resource, also called the reaction or adsorption phase. The reaction time between the ion exchange composite and the aqueous resource can vary. For example, if possible, the aqueous resource can be maintained in contact with the composite until substantially all of the lithium ions are incorporated into the ion exchange composite material. In one embodiment, it is proposed that contact can be maintained from 15 to 360 min.

After a sufficient reaction time between the lithium-bearing brine and the ion exchange composite to achieve a target ion uptake, the composite may be separated from the remaining liquid using a variety of methods such as gravity drainage, vacuum filtration or pressurized purging. The size of the ion exchange composite may be tuned to the selected method to maximize desirable separation characteristics. For example, in one embodiment of the invention using gravity drainage and pressurized purging, the composite is milled to a particle size of 0.5 to 3 mm in diameter.

To maximize the purity of the recovered lithium, care should be taken to separate the feed from the loaded composite. Any residual feed retained with the ion exchange composite contaminates the product with impurities, such as boron, strontium, barium, and more commonly calcium, magnesium, sodium, potassium, etc. As the concentration of these impurities in the aqueous resource is much higher than the lithium, even minimal amounts of aqueous resource carry-over can be unacceptable for achieving product purity which, as noted above, is targeted to be at least 99.5% for battery-grade lithium carbonate.

As such, the ion exchange composite may be washed, for example, with water. This can be during the above-noted separation or as a subsequent step. The wash water requirements can be reduced by recycling the wash water. For example, after use, it can be purified by filtration and/or reverse-osmosis making it suitable for reuse.

After separation and water-washing of the ion exchange composite material, acid can be used to recover lithium ions from the loaded composite. The acid desorbs lithium ions in the molecular sieve to create a recovered lithium ion solution. In one embodiment, the acid is a strong acid such as hydrochloric acid or sulfuric acid. If desired, acid concentration may be maintained at a substantially constant value, for example, through the continuous addition of the selected acid. For example, in one embodiment, the concentration of the acid may be maintained at or greater than 0.1 M. In another example, a pH of greater than 0.5 and less than 1.5 is of interest. The average contact time of the acid with the ion exchange composite material may be up to 60 minutes.

Recovered lithium ion solution after the acid wash can be further purified with a chemical precipitation or polishing ion exchange processes to remove undesired ions. However, efficient washing of the loaded lithium adsorption composite material before passing it onto the acid recovery step minimizes the need for these processes.

The stripped absorbent may be recycled for further lithium recovery. For example, the absorbent composite after recovery of the lithium may be used directly for further cycles of adsorption by contacting it again with further aqueous resource. Once a target concentration is achieved, the elution fluid may be neutralized by adding base, facilitating the precipitation of unwanted ions such as calcium and magnesium. One particularly useful base in this part of the operation is to use lithium hydroxide which in so doing, increases the lithium content and elevates the pH of the elution product prior to any additional refining steps.

Aqueous recovery methods are typically more costly than rock mining methods. The organosilane-grafted lithium ion sieve and the adsorbent composite in the present invention may improve the commercial competitiveness of aqueous recovery methods by improving the deployment characteristics of the incorporated LISs while supporting a long lifecycle of the material through exceptional structural, thermal and chemical stability of the composite.

The present invention will hereinafter be described with reference to exemplary embodiments, which are written to be understood only as examples and are not intended to limit the scope of the present application.

EXAMPLES

Example 1: Organosilane-Grafted Lithium Ion Sieve Preparation

Figure 2:
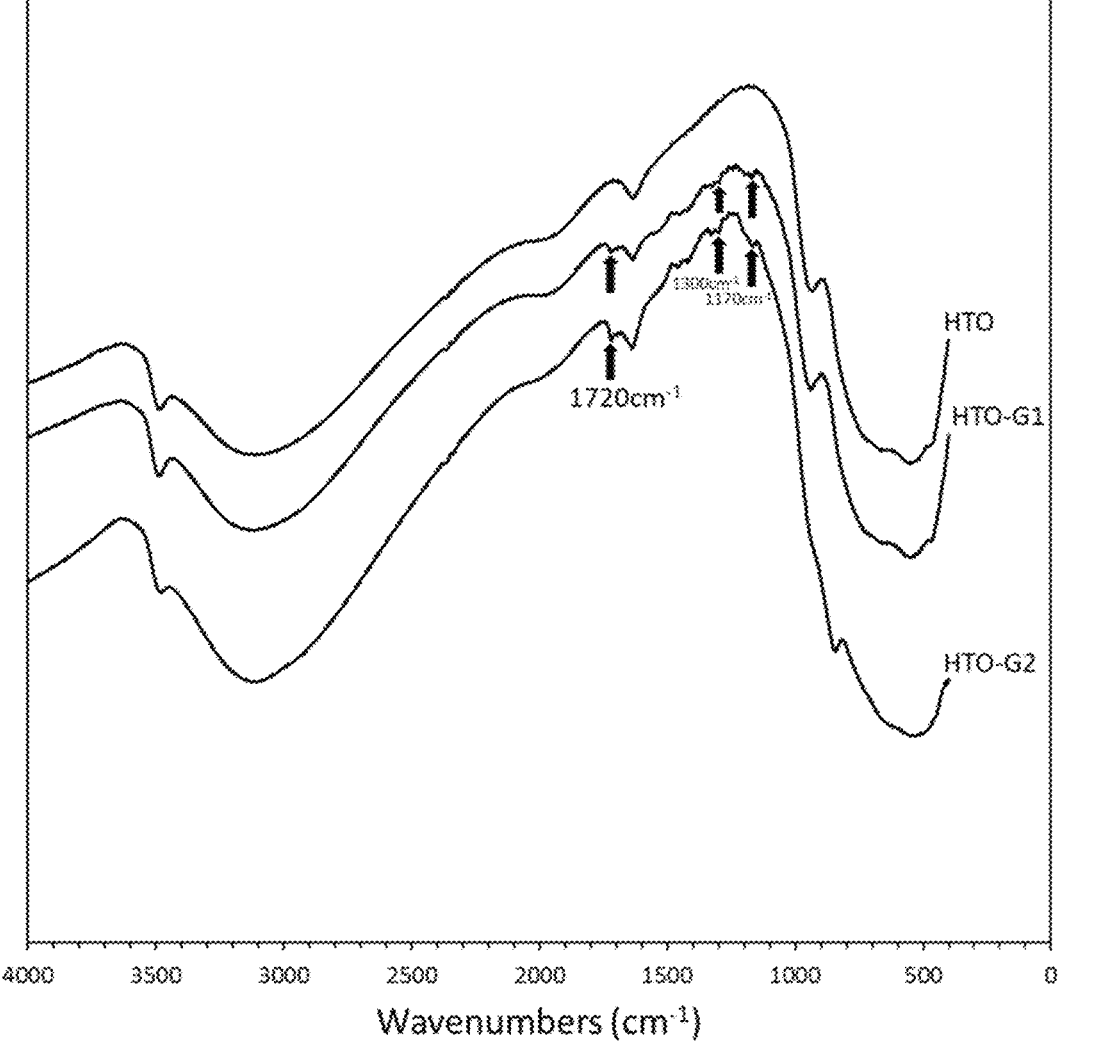
FIG. 2: FTIR spectra of HTO, HTO-G1 and HTO-G2 referenced in Example 1.

Organosilane-grafted lithium ion sieve 'HTO-G1' was manufactured by reacting 10 g of delithiated lithium titanate ion sieve $\alpha$-$Li_2TiO_3$ (HTO) with 6.07 mL of an organosilane reagent methacryloxypropyltrimethoxysilane. This was accomplished by first activating the organosilane in an acidic solvent mixture containing 170.7 mL denatured ethanol, 33.7 mL deionized water and 7.99 mL 99% acetic acid. The mixture was agitated in a polypropylene beaker for 120 minutes prior to adding HTO under further agitation for a duration of 180 minutes to promote further condensation of the silane and association with the HTO via hydrogen bonding and metal-oxygen-silicon bond formation. During the first 60 minutes of reaction time with the sieve the beaker was sonicated to promote dispersal of the sieve and maximize reactive surface area. The partially grafted sieve was collected in a thin layer by vacuum filtration on a 125 mm filter. The filter cake was cured in an oven at 60° C. for 16 hours to form the final organosilane-grafted lithium ion sieve material HTO-G1. After curing, the material was thoroughly washed with denatured alcohol to remove any loosely associated organosilane reagent. This was accomplished by dispersing the material in wash solvent and separating the wash by centrifugation in 15 mL tubes repeated for five wash cycles. The final washed HTO-G1 material was ground finely in a mortar and pestle and characterized by Fourier-transform infrared spectroscopy (FTIR) and carbon, hydrogen, nitrogen and sulfur (CHNS) elemental analysis (FIG. 2 and Table 1).

A second grafted material 'HTO-G2' was similarly prepared according to the procedure above with a more dilute acidic activating solution and alkaline catalysis during grafting to the sieve: Methacryloxypropyltrimethoxysilane (6.070 mL) was activated in 170.7 mL denatured ethanol, 33.7 mL deionized water and 0.585 mL 99% acetic acid. Immediately after addition of 10 g HTO, 20.43 mL of a 1M sodium hydroxide solution was added. The final washed HTO-G2 material was ground finely in a mortar and pestle and characterized by FTIR and CHNS elemental analysis (FIG. 2 and Table 1).

Two more organosilane-grafted lithium ion sieves were produced according to each of the procedures above using 10 g of an orthosilicate ion sieve $\alpha$-$Li_2TiSiO_4$(HTS). The

US 12,629,657 B2

Figure 3:
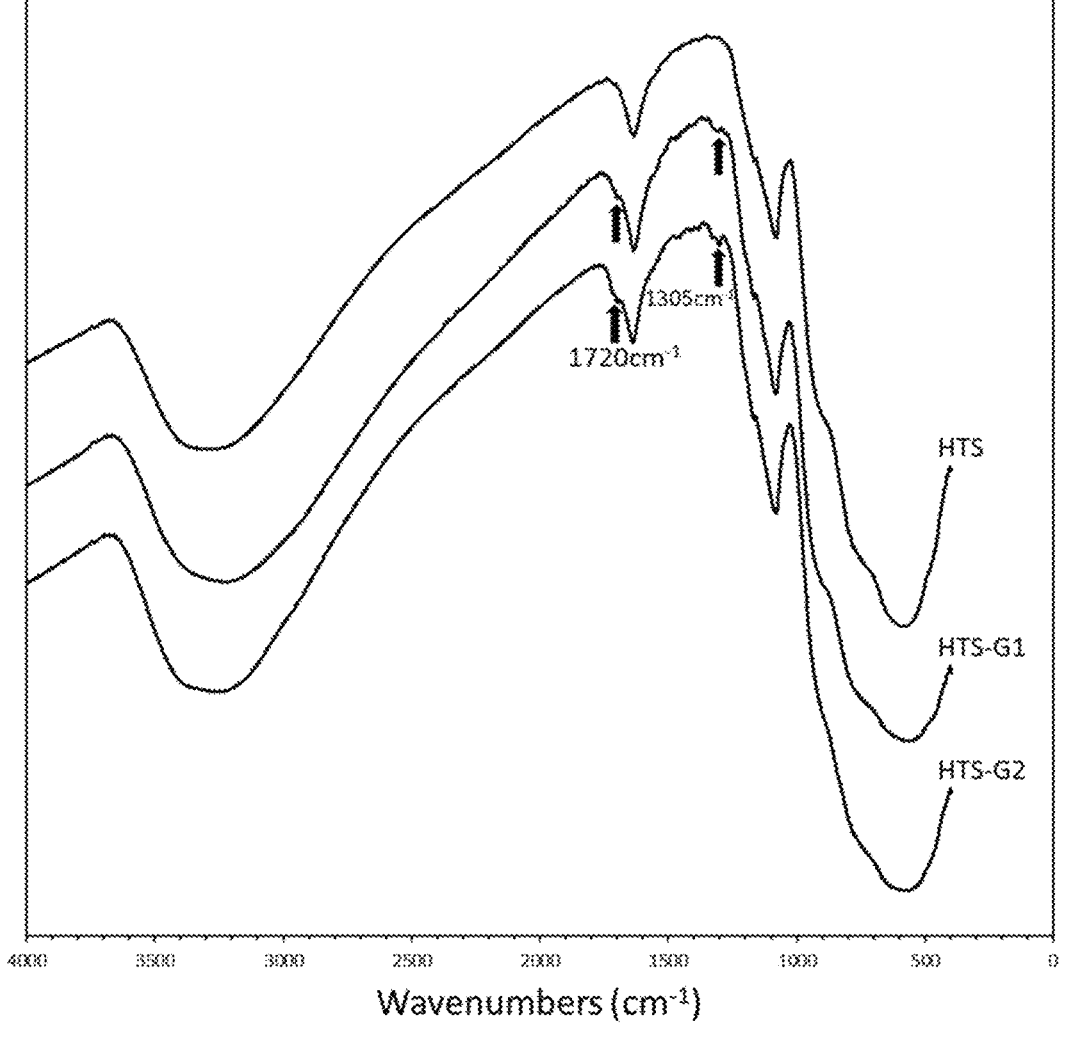
FIG. 3: FTIR spectra of HTS, HTS-G1 and HTS-G2 referenced in Example 1.

15 two materials produced, HTS-G1 and HTS-G2, were characterized by FTIR and CHNS elemental analysis (FIG. 3 and Table 1).

The FTIR characterization of the grafted HTO sieves shows several features not present in the ungrafted HTO control. The band at 1720 cm⁻¹ can be attributed to absorbance of the carbonyl of the methacrylate functional group present in the organosilane reagent. There are several small features present from 1000-1500 cm⁻¹ in the derivatized sieves that are not present in the control. Among these the bands at 1170 and 1300 cm⁻¹ can be assigned to Si—OCH₃ and Si—(CH₂)₃R₁ groups respectively. The former is attributed to the form in which a metal-oxygen-silicon bond to the sieve is present, but some alkoxy groups of the organosilane reagent were not activated and converted to a condensed oligomer. The features attributable to the grafted organosilane are more pronounced in the G2 preparation indicating acidic reagent activation followed by alkaline catalysis was the more effective preparation. Additionally, the trough at 940 cm⁻¹ in the ungrafted HTO spectra is absent in the G2 spectra while a new trough at 845 cm⁻¹ appears indicating the presence of an additional adsorption band in this region attributable to the Si—O—Ti bridge. These spectra provide evidence for successful grafting to HTO as well as the presence of functional groups on the sieve for incorporation into a crosslinked polymer structure.

The FTIR characterization of the grafted HTS sieves shows several features not present in the ungrafted HTS control. The band at 1720 cm⁻¹ is again present as a shoulder. Some of the finer features caused by grafting of the organosilane are obscured by a sharp absorbance band in the native sieve spectra at ~1100 cm⁻¹. The most visible feature is the Si—(CH₂)₃R₁ absorbance band at 1305 cm⁻¹. Again, the G2 spectra gave stronger derivative features indicating this preparation was more effective for both sieve types. These spectra provide evidence for successful grafting to HTS as well as the presence of functional groups on the sieve for incorporation into a crosslinked polymer structure.

TABLE 1

Carbon content of control and organosilane-grafted sieves determined by CHNS elemental analysis

| Sample | Carbon content (% wt.) | Carbon increase (% wt.) |
|---|---|---|
| HTO | 0.26 | n/a |
| HTO-G1 | 1.30 | 1.04 |
| HTO-G2 | 1.31 | 1.05 |
| HTS | 0.08 | n/a |
| HTS-G1 | 0.68 | 0.60 |
| HTS-G2 | 0.94 | 0.86 |

In all cases the carbon content of the sieves was increased after grafting with the methacryloxypropyltrimethoxysilane reagent. A consistent carbon increase of ~1% weight was observed for both HTO grafted sieves relative to the ungrafted HTO control. The HTS sieves increased in carbon content by 0.60% and 0.86% weight after grafting with acidic and alkaline catalysis respectively. The higher relative carbon mass increase observed in the grafted HTO sieves indicates this substrate had the higher reactivity toward the organosilane reagent. This is likely due to differences in the reactive surface area of the sieves. Taken together these results show consistent carbon loading on the sieves thereby providing further evidence that the grafting reaction was successful in all preparations.

16

Example 2: Organosilane-Grafted Lithium Ion Sieve Adsorption

The organosilane-grafted sieves were contacted with a synthetic lithium-bearing brine for adsorption. A portion of each sieve (5.5-6.0 g) was weighed on an analytical balance and added to a 600 mL beaker. A concentrated lithium carbonate solution was prepared with 1000 mg/L Li and adjusted to pH 10 with the addition of concentrated HCl. The synthetic brine was added to the beaker and the mixture was heated under agitation to 60° C. Once heated the mixture was agitated for an additional two hours. Sodium hydroxide solution was added to maintain the pH in the range 9.0-10.0 during brine contact. Following adsorption the sieve and depleted brine were separated by vacuum filtration. The initial and final brine lithium concentrations were determined by inductively coupled plasma optical emission spectroscopy (ICP-OES) analysis. The measured lithium concentrations, initial brine volume, final brine volume and sieve mass were used to determine the lithium uptake (Table 2).

TABLE 2

Lithium uptake of organosilane-grafted sieves from a synthetic lithium bearing brine

| Sample | Li uptake (mg Li/g sieve) |
|---|---|
| HTO-G1 | 13.6 |
| HTO-G2 | 12.2 |
| HTS-G1 | 8.9 |
| HTS-G2 | 7.1 |

Functionality for lithium uptake was clearly demonstrated for all the tested sieves. Differences in uptake capacity between the HTO and HTS sieves may be influenced by particle size which similarly was suspected to impact the reactivity in the organosilane grafting reaction. Increased uptake may be achieved by optimizing the raw sieve materials, grafting reagent and grafting conditions.

Example 3: Organosilane-Grafted Lithium Ion Sieve Polymer Composite Preparation

A ~50 g batch of HTO-G2 was synthesized according to the proportions given in Example 1. The characteristic absorbance peaks in the FTIR spectrum and relative carbon uptake for this larger batch of organosilane-grafted sieve suggested an equal degree of grafting compared to the smaller batch shown above.

Figure 4:
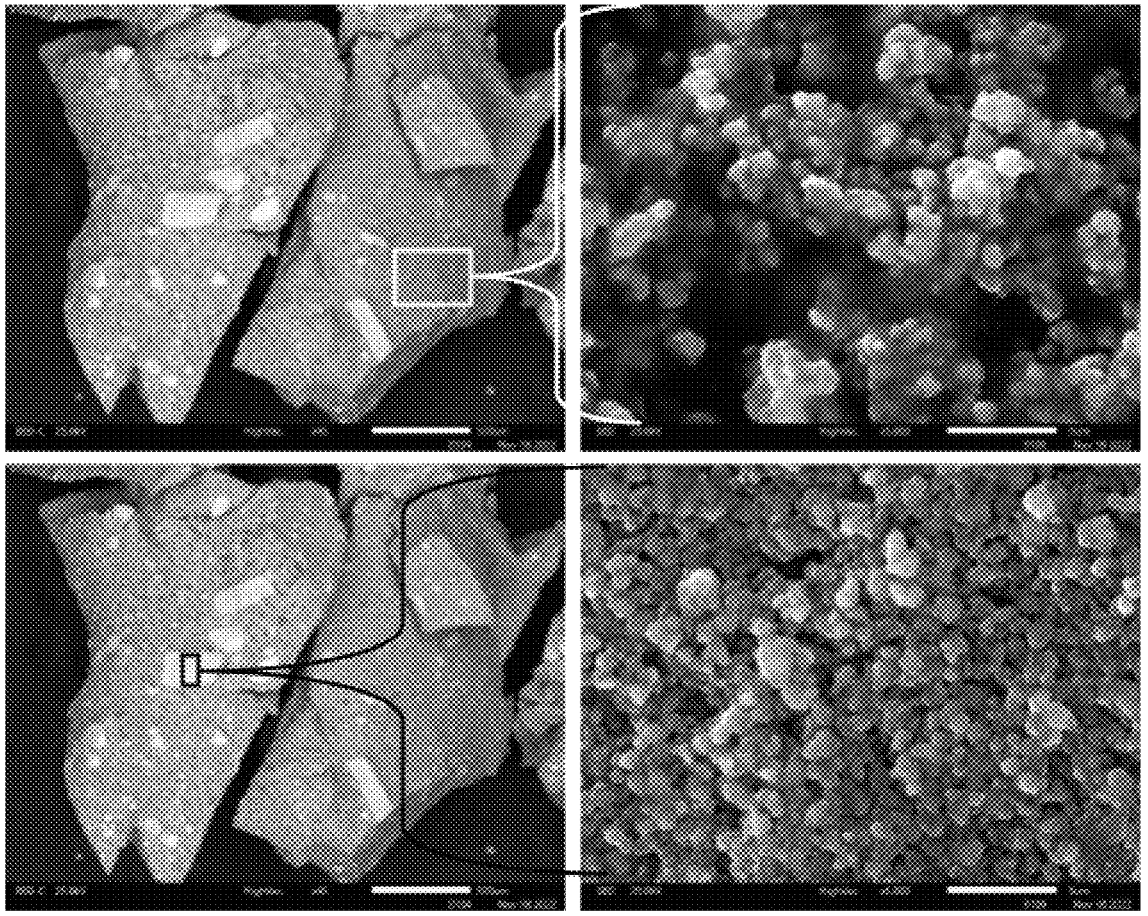
FIG. 4: With reference to Example 3, SEM imaging of prepared organosilane-grafted lithium ion sieve polymer composite. Top Left; low magnification SEM image showing the presence of two surface morphologies in the material a representative region of the more prevalent morphology is highlighted, Top Right; high magnification image of the more prevalent surface morphology showing the presence of lithium ion sieve nodules at low density encompassed by polymer binder, Bottom Left; low magnification SEM image showing the presence of two surface morphologies in the material a representative region of the less prevalent morphology is highlighted, Bottom Right; high magnification image of the less prevalent surface morphology showing the presence of lithium ion sieve nodules at high density.
Figure 5:
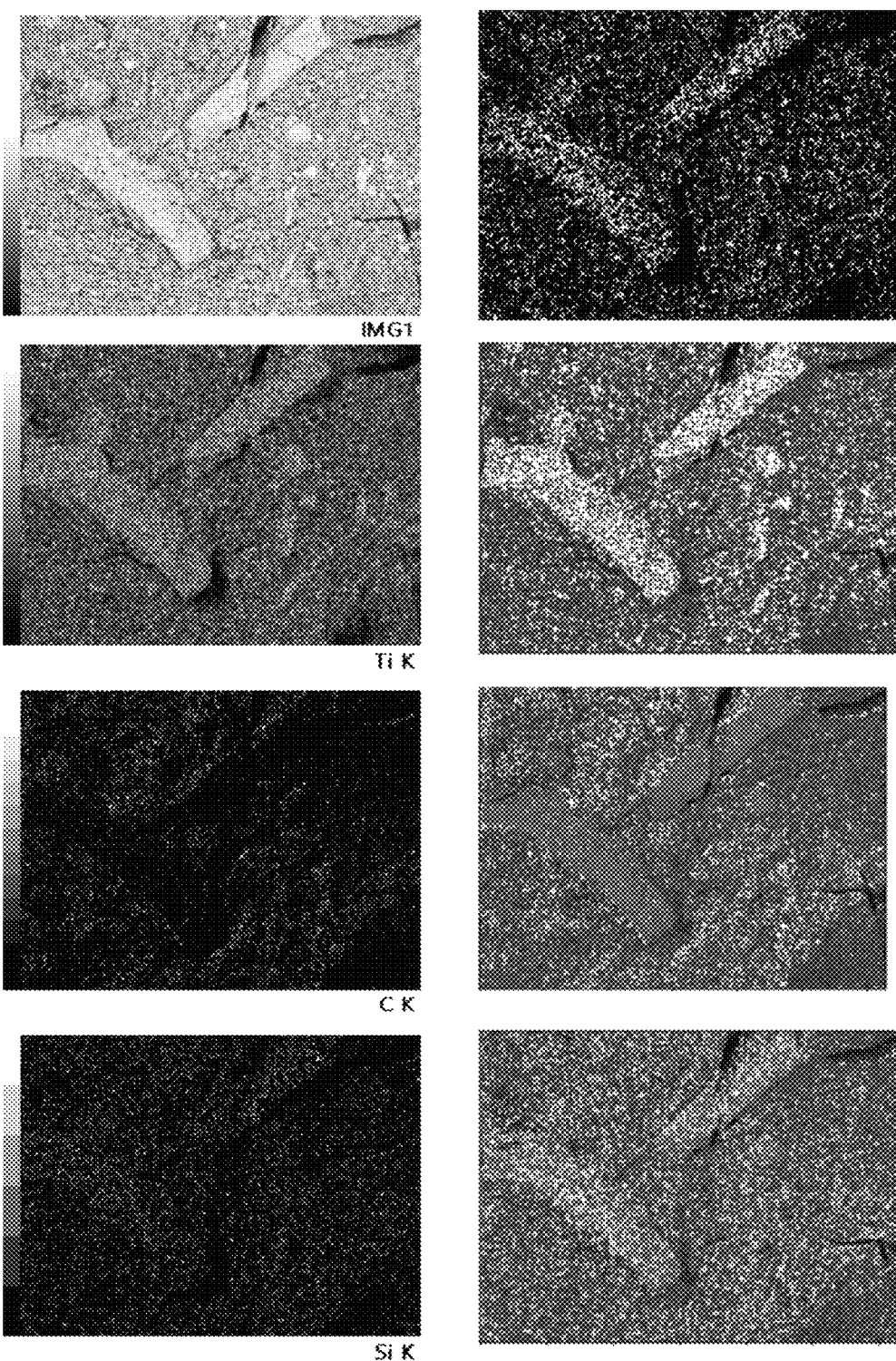
FIG. 5: From Example 3, EDS elemental mapping of prepared organosilane-grafted lithium ion sieve polymer composite. Top left; SEM image of the mapped surface area, Top right; processed image showing pixels in the top quartile of normalized intensity of for both titanium and silicon with no carbon detected, Top middle left; raw titanium EDS map, Top middle right; processed titanium EDS map showing pixels in the top quartile of intensity overlaid over the surface SEM image, Bottom middle left; raw carbon EDS map, Bottom middle right; processed carbon EDS map showing pixels in the top quartile of intensity overlaid over the surface SEM image, Bottom left; raw silicon EDS map, Bottom right; processed silicon EDS map showing pixels in the top quartile of intensity overlaid over the surface SEM image.

Approximately 100 g of lithium ion exchange composite material was then synthesized by reacting the HTO-G2 lithium ion sieve with 2-hydroxyethyl methacrylate and ethylene glycol dimethacrylate. This was accomplished by first mixing 22.13 mL 2-hydroxyethyl methacrylate, 0.578 mL ethylene glycol dimethacrylate, 24.16 mL deionized water, 9.285 mL reagent alcohol and 112 µL N,N,N',N'-tetramethyl ethylenediamine in a 100 mL beaker. To this solution 48.6 g HTO-G2 organosilane-grafted lithium ion sieve was added and stirred to form a well-mixed slurry. To this slurry a solution of 0.198 g ammonium persulfate dissolved in 5 mL deionized water was added under stirring. The well-mixed slurry was then covered and allowed to react under quiescent conditions at room temperature for 16 hours to produce the bulk organosilane-grafted lithium ion sieve polymer composite material. This material was comminuted with a rotating blade cutter and sized from 500-2000 μm with technical mesh sieves. This sized granular material was the final product useful to adsorb lithium ions from lithium-bearing brine. The organosilane-grafted lithium ion sieve polymer composite was characterized by scanning electron microscope (SEM) imaging and energy-dispersive X-ray spectroscopy (EDS) elemental mapping (FIG. 4 & FIG. 5).

The SEM images show a heterogeneous surface morphology in the organosilane-grafted lithium ion sieve polymer composite developed as a result of large domains enriched in lithium ion sieve relative to the surrounding surface. This could result from organization of the sieve during the organosilane grafting reaction. The organosilane reagent forms partially condensed extended linear oligomers under the activation conditions employed which could graft to multiple ion sieve particles thereby promoting formation of sieve-enriched domains. The FTIR characterization of the organosilane-grafted sieve suggested that not all of the grafted organosilane was condensed in an oligomeric structure which may have contributed to the observed heterogeneity.

The EDS mapping images show clustering of silicon with titanium in the high sieve density domains which supports the successful grafting of the organosilane reagent. Silicon is still detected in the lower sieve density regions where carbon is in high abundance supporting the presence of multiple grafting chemistries and incorporation of the grafted sieve into the polymer backbone structure.

Figure 6:
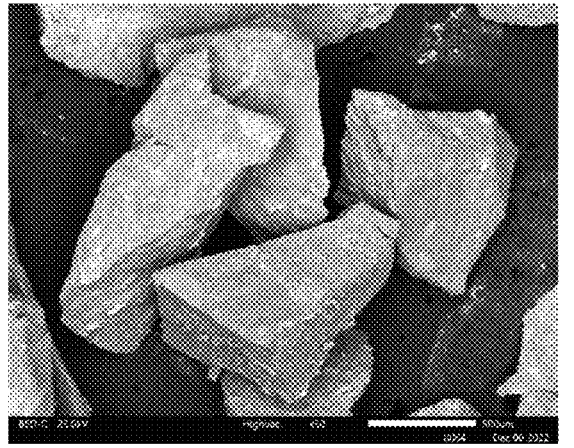
FIG. 6: With reference to Example 3, SEM imaging of prepared lithium ion sieve polymer composite control. Left; low magnification SEM image showing the homogenous surface morphology of the material, Right; high magnification image of the material surface showing the presence of lithium ion sieve nodules encompassed by polymer binder.
Figure 6:
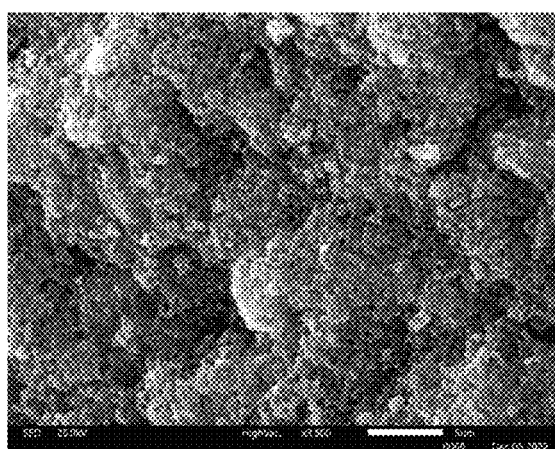
Figure 7:
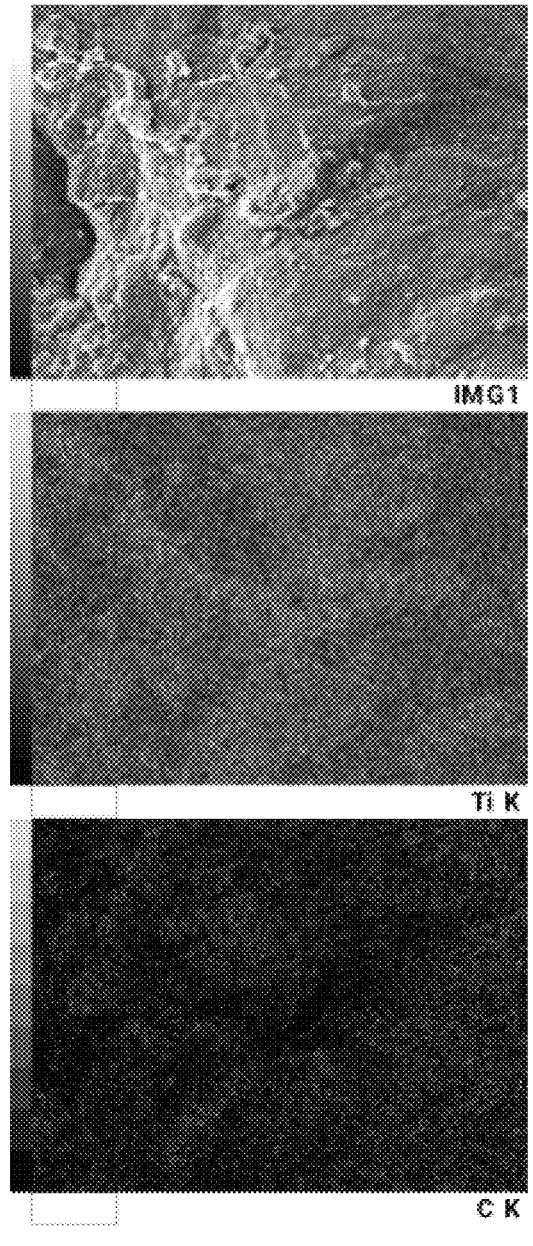
FIG. 7: With reference to Example 3, EDS elemental mapping of prepared lithium ion sieve polymer composite control. Top; SEM image of the mapped surface area, Middle; Titanium EDS map, Bottom; carbon EDS map.

A control material was prepared using an ungrafted lithium ion sieve. Approximately 100 g of lithium ion exchange composite material was synthesized by reacting HTO lithium ion sieve with 2-hydroxyethyl methacrylate and ethylene glycol dimethacrylate. This was accomplished by first mixing 20.67 mL 2-hydroxyethyl methacrylate, 0.540 mL ethylene glycol dimethacrylate, 22.24 mL deionized water, 8.67 mL reagent alcohol and 105 μL N,N,N',N'-Tetramethyl ethylenediamine in a 100 mL beaker. To this solution 45.4 g HTO lithium ion sieve was added and stirred to form a well-mixed slurry. To this slurry a solution of 0.175 g ammonium persulfate dissolved in 5 mL deionized water was added under stirring. The well-mixed slurry was then covered and allowed to react under quiescent conditions at room temperature for 16 hours to produce the bulk lithium ion sieve polymer composite material. This material was comminuted with a rotating blade cutter and sized from 500-2000 μm with technical mesh sieves. This sized granular material was the final product which is ready to adsorb lithium ions from lithium-bearing brine. The control lithium ion sieve polymer composite was characterized by SEM imaging and EDS elemental mapping (FIG. 6 & FIG. 7).

The SEM images show a homogenous surface morphology in the prepared lithium ion polymer composite control. The high magnification image shows a finer surface texture formed by the lithium ion sieve nodules compared to the organosilane-grafted lithium ion sieve polymer composite. This result implies poorer encapsulation of the LIS by the polymer binder in the control material where organosilane grafting is not present. The homogeneity of the surface is supported by the elemental mapping of titanium and carbon which don't show any clear clustering in the control material. Changes in pixel intensity appear to result mainly from the surface topology of the mapped region. These results are in contrast with the SEM imaging and EDS mapping characterization of the organosilane-grafted lithium ion polymer composite highlighting the impact of organosilane grafting on the morphology of the composite material.

Example 4: Lithium Ion Sieve Polymer Composite Adsorption

The organosilane-grafted lithium ion sieve polymer composite prepared in Example 3 was contacted with a synthetic lithium-bearing brine for adsorption. A 25.00 g portion of the composite was weighed on an analytical balance and added to a 600 mL beaker. The synthetic brine was a concentrated lithium carbonate solution prepared with 1000 mg/L Li and adjusted to pH 10 with the addition of concentrated HCl. The synthetic brine was added to the beaker and the mixture was heated under agitation to 80° C. Once heated the mixture was agitated for an additional two hours. Sodium hydroxide solution was added to maintain the pH in the range 9.5-10.0 during brine contact. Following adsorption the sieve and depleted brine were separated by vacuum filtration. The moisture content of the composite material was determined by weighing a portion of the vacuum-drained material on an analytical balance before and after drying at 80° C. for 24 hours. The initial and final brine lithium concentrations were determined by ICP-OES analysis. The measured lithium concentrations, initial brine volume, final brine volume, composite mass and composite moisture content were used to determine a lithium uptake of 11.1 mg Li/g dry composite. This result clearly demonstrates the functionality of the organosilane-grafted lithium ion sieve polymer composite for lithium uptake.

The organosilane-grafted lithium ion sieve polymer composite prepared in Example 3 was contacted with a dilute synthetic lithium-bearing brine for adsorption. A 65.0 g portion of the composite was weighed on a balance and added to a 600 mL beaker. A dilute lithium carbonate solution was prepared with ~275 mg/L Li. The synthetic brine was heated to 80° C. and added to the beaker containing the test composite. The mixture was agitated for sixty minutes and sampled at regular time intervals to monitor the lithium uptake kinetics. Sodium hydroxide solution was added to maintain the pH in the range 9.0-10.0 during brine contact. Following adsorption the depleted brine was decanted and residual depleted brine was removed from the composite by rinsing with two successive portions of deionized water.

Following adsorption the loaded composite was contacted with an acidic solution for elution of lithium. A 0.2M hydrochloric acid solution was prepared and heated to 80° C. and added to the beaker containing the test composite. The mixture was agitated for thirty minutes and the pH remained below 1.5 for the duration of the elution. Following elution, the elution fluid was decanted and residual elution fluid was removed from the composite by rinsing with two successive portions of deionized water.

Figure 8:
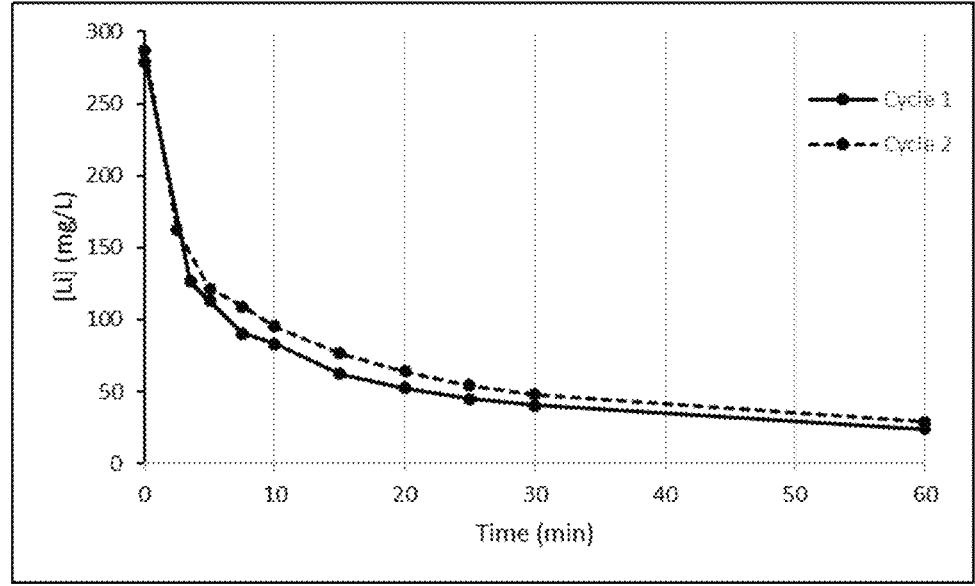
FIG. 8: With reference to Example 4, dilute synthetic brine lithium depletion kinetic curves are plotted for two successive adsorption stages by an organosilane-grafted lithium ion sieve polymer composite.

The adsorption and elution procedures were repeated on the same portion of organosilane-grafted lithium ion sieve polymer composite to assess repeatability. The initial, final and intermediate brine, adsorption rinse, elution fluid and elution rinse lithium concentrations were determined by ICP-OES analysis. The measured lithium concentrations and fluid volumes were used to plot lithium depletion kinetic curves (FIG. 8) and determine the brine depletion and lithium recovery efficiency for both cycles (Table 3).

TABLE 3

Lithium uptake of organosilane-grafted lithium ion sieve polymer composite from a dilute synthetic lithium bearing brine and elution efficiency of adsorbed lithium over two cycles.

| Adsorption cycle | Brine lithium depletion (%) | Elution lithium recovery (% Li adsorbed) |
|---|---|---|
| 1 | 90.2% | 103.0% |
| 2 | 87.9% | 99.6% |

The depletion curves clearly demonstrate the functionality of the organosilane-grafted lithium ion sieve polymer composite for lithium uptake with rapid depletion achieved within 5 minutes of brine contact in both cycles. The adsorption kinetics were reproducible with approximately 90% uptake achieved in 60 minutes during both adsorption stages. Notably elution of the adsorbed lithium was remarkably efficient and reproducible with quantitative recovery observed in both elution stages after 30 minutes of contact with acidic solution. The modest excess recovery in the first trial may indicate release of endogenous lithium originating from the manufacture of the sorbent material. These results give a positive indication of the utility of the organosilane-grafted lithium ion sieve composite material as a rugged lithium sorbent.

The previous descriptions are provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

The invention claimed is:

1. A lithium ion sorbent comprising: an organosilane-grafted lithium ion sieve, wherein the organosilane-grafted lithium ion sieve is a reaction product from an organosilane reagent, wherein the organosilane reagent is selected from the group consisting of 3-acrylamidopropyltrimethoxysilane, n-(3-acryloxy-2-hydroxypropyl)-3-aminopropyltriethoxysilane, acryloxymethyltrimethoxysilane, (3-acryloxymethyl) phenethyltrimethoxysilane, (3-acryloxypropyl) trimethoxysilane, (3-acryloxypropyl)methyldiethoxysilane, (3-acryloxypropyl)methyldimethoxysilane, (3-acryloxypropyl)dimethylmethoxysilane and combinations thereof.

2. The lithium ion sorbent of claim 1 wherein the lithium ion sieve is a delithiated metal oxide according to the formula:

$$(de\text{-}Li_a)X_bY_cZ_dO_e$$

where a is between 1 and 4, the sum of b, c and d is between 1 and 5 and e is between 3 and 12 and X, Y, and Z are each selected from Fe, Mg, Ca, Ni, Mn, Co, Zn, Cu, Ti, V, Sr or Zr.

3. The lithium ion sorbent of claim 2 wherein the lithium ion sieve is a delithiated manganese or titanium-based oxide according to $Li_aMn_dO_e$ or lithium titanium oxides $Li_aTi_dO_e$.

4. The lithium ion sorbent of claim 1 wherein the lithium ion sieve contains a delithiated orthosilicate according to the formula:

$$(de\text{-}Li_2)U_{1\text{-}f\text{-}g}V_fW_gSiO_4$$

where f and g are together=0 to 1 and U, V and W are each Fe, Mg, Ca, Ni, Mn, Co, Zn, Cu, Ti, V, Sr or Zr.

5. A lithium ion sorbent comprising: an organosilane-grafted lithium ion sieve, wherein the organosilane-grafted lithium ion sieve is a reaction product from an organosilane reagent of the general formula:

$$R^1\text{—}(CH_2)_n\text{—}Si\text{—}R^4{}_3$$

wherein $R^1$ is a group containing vinyl functionality, $R^4$ is either a hydrolysable alkoxy group or a methyl group, where at least one of the three $R^4$ groups is a hydrolysable alkoxy group and n is 1-3.

6. The lithium ion sorbent of claim 5 wherein the organosilane reagent is selected from the group consisting of:

11-allyloxyundecyltrimethoxysilane, m-allylphenylpropyltriethoxysilane, allyltriethoxysilane, allyltrimethoxysilane, [(5-bicyclo[2.2.1]hept-2-enyl)ethyl]trimethoxysilane, (5-bicyclo[2.2.1]hept-2-enyl) methyldichlorosilane, 5-bicyclo[2.2.1]hept-2-enyl) triethoxysilanenorbornenyltriethoxysilane, 3-butenyltriethoxysilane, 2-(chloromethyl) allyltrimethoxysilane, [2-(3-cyclohexenyl)ethyl]triethoxysilane, [2-(3-cyclohexenyl)ethyl]trimethoxysilane, 3-cyclohexenyltrimethoxysilane, (3-cyclopentadienylpropyl)triethoxysilane, 2-(divinylmethylsilyl)ethyltriethoxysilane, docosenyltriethoxysilane, hexadecafluorododec-11-en-1-yltrimethoxysilane, 5-hexenyltriethoxysilane, 5-hexenyltrimethoxysilane, 7-octenyltrimethoxysilane, o-(propargyl)-n-(triethoxysilylpropyl) carbamate, styrylethyltrimethoxysilane, 3-(n-styrylmethyl-2-aminoethylamino) propyltrimethoxysilane, 10-undecenyltrimethoxysilane, o-(vinyloxybutyl)-n-triethoxysilylpropyl carbamate, vinyltriacetoxysilane, vinyltri-t-butoxysilane, vinyltriethoxysilane, vinyltriisopropenoxysilane, vinyltriisopropoxysilane, vinyltrimethoxysilane, vinyltris(2-methoxyethoxy) silane, vinyltris(1-methoxy-2-propoxy) silane, vinyltris (methylethylketoximino) silane, n-allyl-aza-2,2-dimethoxysilacyclopentane, allylmethyldimethoxysilane, (5-bicyclo[2.2.1]hept-2-enyl)methyldiethoxysilane, vinylmethyldiethoxysilane, vinylmethyldimethoxysilane, (5-bicyclo[2.2.1]hept-2-enyl)dimethylethoxysilane, trivinylmethoxysilane, vinyldimethylethoxysilane and combinations thereof.

7. A lithium ion sorbent comprising: an organosilane-grafted lithium ion sieve, wherein the organosilane-grafted lithium ion sieve is a reaction product from an organosilane reagent, a lithium ion sieve and a dipodal organosilane reagent, the dipodal organosilane reagent being of the general formula:

$$R^5\text{—}((CH_2)_n)_2\text{—}(Si\text{—}R^6{}_3)_2,$$

where $R^5$ is an organic moiety containing a vinyl, aliphatic or aromatic group, $R^6$ is a hydrolysable alkoxy group or a methyl group, where at least two of the three $R^6$ substituent groups on each silicon atom are hydrolysable alkoxy groups, and n is 0-3 and may have one or two values depending on the symmetry of the two methylene chains.

8. The lithium ion sorbent of claim 7, wherein the dipodal organosilane reagent is selected from the group consisting of:

1,2-bis(methyldiethoxysilyl)ethylene, bis(triethoxysilyl-ethyl) vinylmethylsilane, 1,2-bis(triethoxysilyl)ethyl-ene, 1,3-[bis(3-triethoxysilylpropyl) polyethylenoxy]-2-methylenepropane, 1,1-bis(trimethoxysilylmethyl) ethylene, bis(3-trimethoxysilylpropyl) fumarate, bis [(3-methyldimethoxysilyl) propyl]polypropylene oxide, 1,2-bis(triethoxysilyl) ethane, bis(triethoxysilyl) methane, 1,8-bis(triethoxysilyl) octane, 1,2-bis (trimethoxysilyl) decane, 1,2-bis(trimethoxysilyl) eth-ane, bis(trimethoxysilylethyl)benzene, 1,6-bis (trimethoxysilyl) hexane, 1-(triethoxysilyl)-2-(diethoxymethylsilyl) ethane and combinations thereof.

9. A method for producing a lithium ion sorbent comprising:

an organosilane-grafted lithium ion sieve covalently incorporated into a porous crosslinked polymeric support scaffold, the method comprising:

reacting an organosilane reagent with a lithium ion sieve to produce the organosilane-grafted lithium ion sieve; and free-radical copolymerization of the organosilane-grafted lithium ion sieve in a pre-polymer mixture containing comonomers to covalently incorporate the organosilane-grafted lithium ion sieve within a polymer scaffold support, wherein the comonomers include:

a principal monomer or monomers containing a vinyl, acrylate, acrylate derivative, methacrylate or methacrylate derivative functional moiety; and a crosslinking monomer or monomers containing two vinyl, acrylate, acrylate derivative, methacrylate or methacrylate derivative functional moieties or combinations thereof.

10. The method of claim 9 wherein the pre-polymer mixture also contains a porogenic solvent and a dissolved chemical radical initiator.

* * * * *